UNITED STATES PATENT OFFICE.

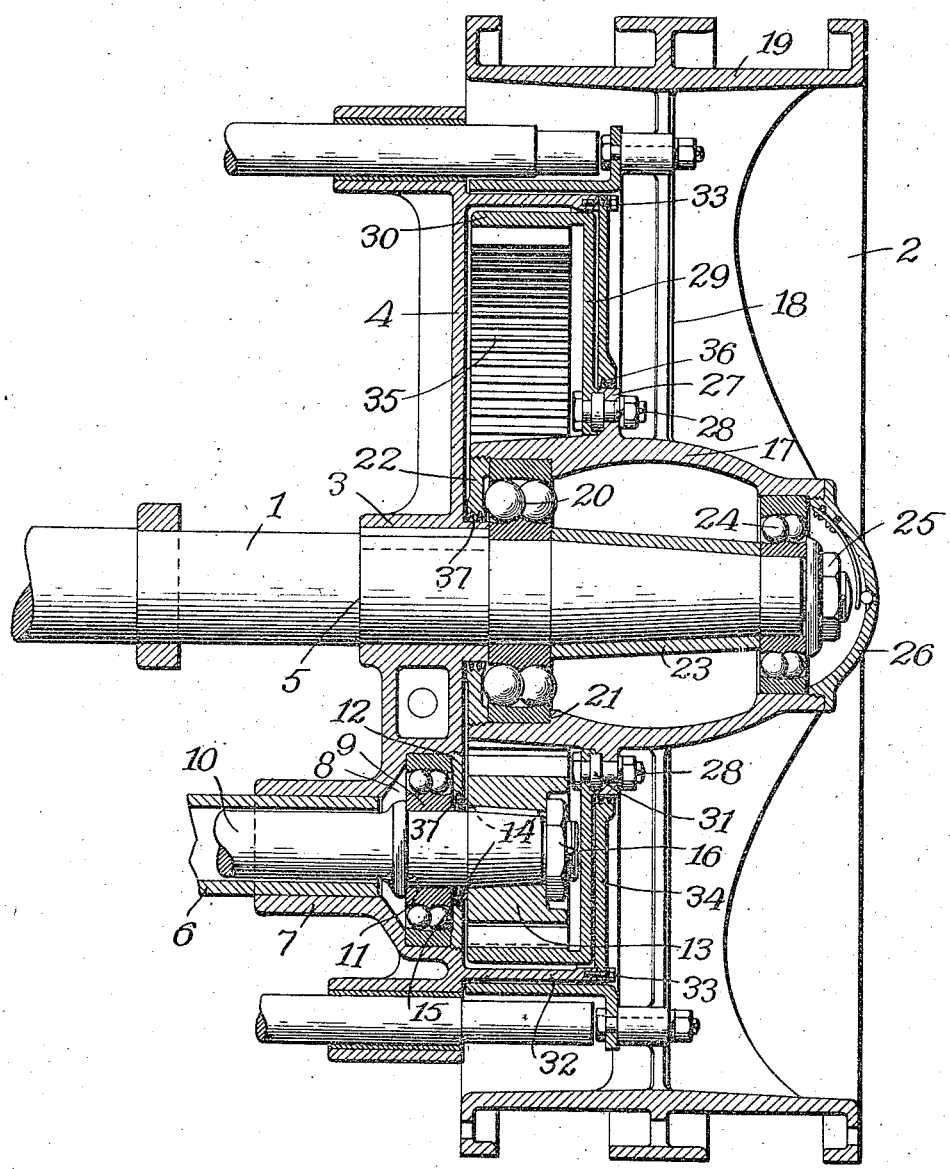
A. O. HIGINBOTHAM.
MOTOR VEHICLE.
APPLICATION FILED AUG. 8, 1914.
1,196,864.
Patented Sept. 5, 1916.
Witnesses.
R. D. Tolman
Penelope Cumberbach
Inventor
Arthur O. Higinbotham
By Fowler & Kennedy
Attorneys.

ARTHUR O. HIGINBOTHAM, OF WORCESTER, MASSACHUSETTS, ASSIGNOR TO CHARLES B. FOSTER AND COMPANY, A COPARTNERSHIP OF WORCESTER, MASSACHUSETTS, CONSISTING OF CHARLES B. FOSTER, ARTHUR O. HIGINBOTHAM, AND JEROME R. GEORGE.

MOTOR-VEHICLE.

1,196,864.   Specification of Letters Patent.   Patented Sept. 5, 1916.

Application filed August 8, 1914. Serial No. 855,841.

*To all whom it may concern:*

Be it known that I, ARTHUR O. HIGINBOTHAM, a citizen of the United States, residing at Worcester, in the county of Worcester and Commonwealth of Massachusetts, have invented a new and useful Improvement in Motor-Vehicles, of which the following, taken in connection with the accompanying drawing, is a specification.

The present invention relates to motor vehicles, and in particular to means for transmitting the power from the prime mover to the driving wheels of such vehicles.

The obvious advantages to be obtained by relieving the power transmission means of the weight of the vehicle, particularly in heavy truck or commercial vehicle practice, has resulted in various constructions for supporting said driving wheels independently of the rotating power shaft, and for connecting the latter to said wheels by means of chains, or the like. It has also been proposed, heretofore, to secure to each rear or driving wheel a gear, and to provide an intermeshing pinion on the end of a power shaft for imparting rotation to said wheel and gear. By the above construction, it is possible to journal the wheels on the ends of a "dead" axle, which latter carries the entire weight of the vehicle; and the driving gear is thus entirely relieved of the weight of the vehicle, and is not subjected to the usual shocks and strains incidental to the passage of the drive wheels over rough roads. However, it has been found difficult heretofore to maintain the coöperating teeth of the said gear and driving pinion in perfect mesh and alinement, owing to the prevailing methods of securing said gear, usually an internal gear, to the wheel, whereby any distortion of said wheel has been communicated to said gear to render the latter incapable of meshing properly and perfectly with said pinion. Furthermore, great difficulty has been experienced in providing for the efficient lubrication of said gear and pinion, and in preventing the access of dust and dirt thereto.

The present invention contemplates the elimination of the above described disadvantages by the construction particularly pointed out in the following description and the claims annexed thereto, reference being had to the accompanying drawing, in which the figure represents a transverse sectional view of a motor vehicle drive wheel embodying my invention.

In said figure the numeral 1 is used to designate a rear "dead" axle, extending transversely of the vehicle and serving for the support of the same through the usual springs, not shown. Only one end of said axle is shown in the drawing, since the construction and arrangement of parts at each end thereof is identical. At each end said axle has rotatably journaled thereon, in the manner hereinafter described, a driving wheel 2, said wheels serving for the support of said axle above the road surface. Adjacent each wheel said axle has keyed thereon the hub 3 of a spider 4, said hub engaging at its inner end a shoulder 5 on said axle, whereby inward movement of said spider on said axle is prevented. The two spiders 4, carried by said axle near opposite ends thereof, serve for the support of a casing 6 which incloses the so-called differential gearing of the vehicle, and which carries the "jack" shafts, operated through said gearing, ordinarily employed to impart rotation to the driving wheels. An end only of said casing 6 is shown; said end enters and is supported by a hollow boss 7 formed on the inner face of said spider forwardly of the axle 1 and in substantially the same horizontal plane as said axle. Each boss 7 opens into a recess 8 formed on the outer face of the spider 4, said recess containing an antifriction or ball bearing 9 for the jack shaft 10, which has a shoulder 11 thereon, serving as a limiting abutment for the inner raceway of said ball bearing. The outer raceway of said bearing seats in the bottom of the recess 8 and is held from outward movement by a retaining ring 12 secured in the outer face of the spider. A pinion 13 is keyed on the end of said shaft, and between the inner end of said pinion and the inner raceway of said ball bearing 9 the shaft 10 is surrounded loosely by a ring 14 having a running fit within the opening through the retaining ring 12, and inclosing a spiral spring 15 which operates to yieldingly maintain said inner raceway of the ball bearing against the shoulder 11 of the shaft. The pinion 13 is held on said shaft by a nut 16 carried on the reduced outer end of the shaft.

The wheel 2, above referred to, comprises an elongated hub 17, having formed preferably integral therewith a plurality of radial webs or spokes 18 which support the preferably integral rim 19. The inner end of the interior of said hub receives an antifriction bearing 20, the outer raceway of which is held against an interior shoulder 21 of the hub by a retaining ring 22 secured in said hub and surrounding and having a running fit on the hub 3 of the spider 4. When the wheel thus equipped is placed on the axle 1, the inner raceway of bearing 20 bears against the outer end of hub 3 and is held against outward movement by a spacer 23 fitted upon the tapered outer end of the axle, and held stationary by the inner raceway of a second antifriction bearing 24 which fills the space between the outer ends of the hub 17 and axle 1, and is held on the latter by a nut 25, carried on said axle. The open end of hub 17 is closed by a dust cap 26 secured thereto and having a valve controlled opening therethrough for the introduction of lubricant.

The hub 17, at a section thereof inwardly of the junction of the webs or spokes 18 therewith, constituting the bridge, or point of greatest diameter of said hub, has an annular web or flange 27, against the inner face of which is secured, by an annular series of bolts 28, an annular plate 29 having an inturned rim 30 extending nearly to the outer face of the spider 4. The registering holes in the flange 27 and plate 29 for the bolts 28 are counterbored on the opposing faces of said members to provide for collars 31 surrounding said bolts and serving, by reason of their greater diameter, to offer a greater resistance to the sheer on said bolts, in the well known manner. The outer face of spider 4 has an outwardly extending annular flange 32 surrounding the rim 30 and spaced slightly therefrom, the outer edge of said flange 32 having secured thereto, by an annular series of bolts 33, an annular plate 34 disposed outwardly of the plate 29 and surrounding and having a running fit with the periphery of flange or web 27. The interior of rim 30 is formed with teeth 35 constituting an internal gear in mesh with the teeth of pinion 13, and providing for the driving of the wheel 2 by the rotation of said pinion.

It will be seen that the pinion 13 and the internal gear 35 are contained within a closed annular chamber, having its ends formed by the spider 4 and the plate 34, its inner wall formed by the periphery of hub 17 and its outer wall formed by the flange 32 of spider 4. The only exterior running joint through which it is possible for dust or dirt to enter this chamber is the joint between the plate 34 and the web or flange 27 of the hub, and in order to effectually close this joint against the entrance of foreign matter, annular strips of packing material 36 are embedded in that edge of said plate with which the flange 27 makes contact. The running joints between ring 22 and hub 3 and between rings 12 and 14 are similarly provided with packing material, as shown at 37, 37.

The above described chamber inclosing the internal gear and its driving pinion has no running joints on its inner face; and the single joint on its outer face is made as near as possible to the center of the wheel to remove it from the possibility of encountering any mud or water through which the wheel might pass. The differential casing 6, as shown, opens into the said chamber, and lubricant from said casing, after passing through the bearing 9 has access to said chamber by passing through the running joint between the rings 12 and 14. By reason of the construction of said chamber as above described, no lubricant can possibly escape therefrom until the level of said lubricant therein rises to the height of the running joint between the plate 34 and the hub, and thus an adequate supply of lubricant is always insured.

The supporting of the internal gear 35 directly from the hub 17 of the wheel, instead of from the rim, or from the spokes, as in the usual practice, insures the true and accurate meshing of the teeth of said gear with the teeth of pinion 13, so long as said hub runs true on the axle 1. The distortion of the wheel, by springing of the rim or the spokes, has no effect on the gear 35, since the latter is not supported by said rim or said spokes. Furthermore, by reason of the suspension of the casing 6, containing the driving gear, from the rigid spiders 4, 4, all as set forth and described in my copending application Serial No. 855,525, filed August 6, 1914, for a motor vehicle, it will be seen that the relative positions of the internal gear 35 and the pinion 13 always remain the same irrespective of the position which the rear wheels assume relative to the frame of the vehicle.

The lubrication of the bearings 20 and 24 of the wheel hub is effected by the introduction of lubricant through the dust cap 26, in the usual manner. When the lubricant thus introduced into the interior of the hub 17 rises above the height of the running joint between ring 22 and hub 3, it overflows into the annular chamber containing the internal gear 35 and pinion 13 and assists in the lubrication of said parts.

I claim,

1. In a motor vehicle, a dead axle, a wheel journaled for rotation thereon, an internal gear carried by the hub of said wheel, a housing inclosing said gear and supported by said axle, said housing making a pinrality of running joints with said hub, whereby to maintain a supply of lubricant therein at all times above the lowest point of said gear, a driving shaft, parallel to said axle, entering said housing and a pinion on said shaft in mesh with the teeth of said gear.

2. In a motor vehicle, a dead axle, a wheel journaled for rotation thereon, an internal gear carried by the hub of said wheel, and disposed inwardly of the tread of said wheel, a housing inclosing said gear, said housing comprising an inner plate carried by said axle and having a running joint with said hub, and an outer plate secured to the inner plate and having a running joint with said hub, a driving shaft, parallel to said axle, entering said inner plate, and a pinion carried by said shaft in mesh with the teeth of said gear.

Dated this thirtieth day of July, 1914.

ARTHUR O. HIGINBOTHAM.

Witnesses:
PENELOPE COMBERBACH,
NELLIE WHALEN.